(12) United States Patent
Saito

(10) Patent No.: US 11,706,504 B2
(45) Date of Patent: Jul. 18, 2023

(54) INFORMATION PROCESSING METHOD, INFORMATION PROCESSING DEVICE, AND RECORDING MEDIUM

(71) Applicant: Roland Corporation, Shizuoka (JP)

(72) Inventor: Yasuto Saito, Shizuoka (JP)

(73) Assignee: Roland Corporation, Shizuoka (JP)

( * ) Notice: Subject to any disclaimer, the term of this patent is extended or adjusted under 35 U.S.C. 154(b) by 0 days.

(21) Appl. No.: 17/629,767

(22) PCT Filed: Sep. 6, 2019

(86) PCT No.: PCT/JP2019/035246
§ 371 (c)(1),
(2) Date: Jan. 24, 2022

(87) PCT Pub. No.: WO2021/044621
PCT Pub. Date: Mar. 11, 2021

(65) Prior Publication Data
US 2022/0417621 A1 Dec. 29, 2022

(51) Int. Cl.
*H04N 21/8547* (2011.01)
*H04N 21/242* (2011.01)
(Continued)

(52) U.S. Cl.
CPC ....... *H04N 21/8547* (2013.01); *H04N 21/242* (2013.01)

(58) Field of Classification Search
None
See application file for complete search history.

(56) References Cited

U.S. PATENT DOCUMENTS

2008/0225651 A1* 9/2008 Waites ................. G11B 27/034
369/4
2013/0170507 A1* 7/2013 Hsueh ..................... H04L 63/04
370/503
(Continued)

FOREIGN PATENT DOCUMENTS

JP H06162736 6/1994
JP 2002325216 11/2002
(Continued)

OTHER PUBLICATIONS

"International Search Report (Form PCT/ISA/210) of PCT/JP2019/035246," dated Oct. 8, 2019, with English translation thereof, pp. 1-4.

*Primary Examiner* — Hung Q Dang
(74) *Attorney, Agent, or Firm* — JCIPRNET

(57) ABSTRACT

In a video system for imaging a target object by using first and second imaging devices, an information processing method is executed by the first imaging device. The information processing method includes: a step for acquiring a first elapsed time indicating the time elapsed after start of recording by the first imaging device; a step for requesting the second imaging device to transmit a second elapsed time indicating the time elapsed after start of recording by the second imaging device, and receiving the second elapsed time; a step for acquiring a required time to receive the second elapsed time after the request is made; and a step for, based on the first elapsed time, the second elapsed time, and the required time, calculating an offset time for synchronizing a first moving image recorded by the first imaging device and a second moving image recorded by the second imaging device.

18 Claims, 13 Drawing Sheets

| Master | | Slave | | Communication required time (T3) | Offset time |
|---|---|---|---|---|---|
| File name | Time stamp (T1) | File name | Time stamp (T2) | | |
| MOV0001A | 00:00:01.70 | MOV0001B | 00:00:01.60 | 00:00:00.30 | 00:00:00.25 |

(51) Int. Cl.
*G11B 27/00* (2006.01)
*H04N 23/00* (2023.01)

(56) References Cited

U.S. PATENT DOCUMENTS

| | | | |
|---|---|---|---|
| 2014/0049636 A1* | 2/2014 | O'Donnell | H04N 21/234363 348/143 |
| 2016/0021292 A1* | 1/2016 | Zhang | H04N 5/06 348/211.2 |
| 2023/0046779 A1* | 2/2023 | Sonnleitner | H04N 21/43072 |

FOREIGN PATENT DOCUMENTS

| | | |
|---|---|---|
| JP | 2004247937 | 9/2004 |
| JP | 2004312295 | 11/2004 |
| JP | 2006180074 | 7/2006 |
| JP | 2011029969 | 2/2011 |
| JP | 2011055294 | 3/2011 |
| JP | 2013187826 | 9/2013 |
| JP | 2016100778 | 5/2016 |
| WO | 2019053857 | 3/2019 |

\* cited by examiner

Information processing device 100A 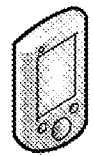
Information processing device 100B 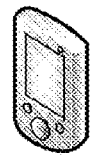
Player 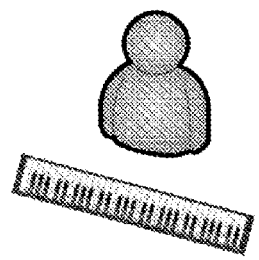
FIG. 1

(A)

Video source A: 1 2 3 4 5 6 7 8

Video source B: 2 3 4 5 6 7 8

(B)

Video source A: 1 2 3 4 5 6 7 8

Video source C: 1 2 3 4 5 6 7

(The numerical value in the video source is time)

FIG. 3

| Master | | Slave | | | Offset time |
|---|---|---|---|---|---|
| File name | Time stamp (T1) | File name | Time stamp (T2) | Communication required time (T3) | |
| MOV0001A | 00:00:01.70 | MOV0001B | 00:00:01.60 | 00:00:00.30 | 00:00:00.25 |

FIG. 9

INFORMATION PROCESSING METHOD, INFORMATION PROCESSING DEVICE, AND RECORDING MEDIUM

CROSS-REFERENCE TO RELATED APPLICATION

This application is a 371 application of the International PCT application serial no. PCT/JP2019/035246, filed on Sep. 6, 2019. The entirety of the above-mentioned patent application is hereby incorporated by reference herein and made a part of this specification.

TECHNICAL FIELD

The present invention relates to a technique for synchronizing videos taken by a plurality of devices.

RELATED ART

There is known a method of imaging a song or performance of an artist or musician from multiple angles and joining the obtained videos to create a single music video. In such a method, it is necessary to take videos with a plurality of cameras arranged at different angles and to join the videos by editing.

When a target object is imaged with a plurality of cameras and the timings to start the imaging are different, it is necessary to synchronize the videos somehow. As a general method for synchronizing videos, a method of giving a signal at the start of imaging with a clapperboard or the like is often used. For example, Patent Literature 1 describes a method of detecting a signal, determining a deviation amount between the videos, and performing alignment.

CITATION LIST

Patent Literature

[Patent Literature 1] Japanese Patent Laid-Open No. 6-162736

SUMMARY OF INVENTION

Technical Problem

In the device described in Patent Literature 1, it is necessary to capture the phenomenon that becomes a signal (for example, movement or sound of the clapperboard) in all the imaging devices. However, the device cannot be used in scenes where it is difficult to give a signal, such as a concert or recital.

In view of the above, the present invention aims to provide a technique for synchronizing videos taken in a system that images a recording target by using a plurality of imaging devices.

Solution to Problem

An information processing method according to the present invention is executed by a first imaging device in a video system that images a target object by using the first imaging device and a second imaging device. The information processing method includes: a first acquisition step of acquiring a first elapsed time indicating an elapsed time after the first imaging device starts recording; a second acquisition step of requesting the second imaging device to transmit a second elapsed time indicating an elapsed time after the second imaging device starts recording, and receiving the second elapsed time; a third acquisition step of acquiring a required time to receive the second elapsed time after the requesting; and a calculation step of, based on the first elapsed time, the second elapsed time, and the required time, calculating an offset time for synchronizing a first moving image recorded by the first imaging device and a second moving image recorded by the second imaging device.

The first imaging device and the second imaging device are both devices for imaging the target object. The first imaging device acquires the first elapsed time indicating the elapsed time after starting recording, and requests the second imaging device to transmit the second elapsed time and compares the obtained elapsed time with the first elapsed time. Further, the time required for the inquiry is used to calculate the deviation time (offset time) between the moving images. The transmission of the elapsed time can be requested at any timing when the first and second imaging devices are recording. For example, the request for transmission may be made at the start of recording, or may be made periodically during the recording. By acquiring the offset time between the first moving image recorded by the first imaging device and the second moving image recorded by the second imaging device, it is possible to calculate the deviation amount when editing between a plurality of moving images.

In the present application, the offset time refers to the deviation amount of the absolute time between the moving images, and the synchronization means matching the absolute times of the moving images with each other in the process of editing.

SUMMARY OF INVENTION

Further, when the first elapsed time is T1, the second elapsed time is T2, and the required time is T3, in the calculation step, a difference between T1+(T3/2) and T2 may be taken as the offset time. According to such a configuration, the offset time can be calculated by a simple process.

Further, the first imaging device may acquire the second moving image from the second imaging device and store the second moving image in association with the offset time. By storing the moving image and the offset time in association with each other, even if the number of subordinate imaging devices (second imaging devices) is increased to two or more, or the recording is repeated, appropriate management can still be performed.

Further, the information processing method may further include: a generation step of synchronizing the first moving image and the second moving image by using the offset time, and synthesizing synchronized moving images to generate a third moving image.

For example, in the process of editing, when each moving image is arranged on the timeline, it is possible to synchronize the moving images by shifting them by the offset time.

Further, the information processing method may further include: a step of periodically calculating the offset time within a predetermined time width, and acquiring a representative value of a plurality of the offset times obtained. In the calculation step, the representative value is taken as an offset time between the first moving image and the second moving image within the predetermined time width.

When the first imaging device and the second imaging device are operating by clocks different from each other, the deviation width may increase as time passes even if the heads are synchronized. In order to cope with this, the offset time may be calculated multiple times during recording.

For example, after periodically calculating the offset time, a representative value (for example, an average value) of a plurality of offset times within a predetermined time width (for example, 30 seconds) is obtained. By treating this representative value as the offset time within the predetermined time width (for example, 30 seconds), it is possible to appropriately correct the deviation time.

Furthermore, an information processing method according to another embodiment of the present invention is executed by an information processing device operable as a first imaging device and a second imaging device in a video system that images a target object by using the first imaging device and the second imaging device. When the information processing device is the first imaging device, the information processing device executes: a first acquisition step of acquiring a first elapsed time indicating an elapsed time after the first imaging device starts recording; a request step of requesting the second imaging device to transmit a second elapsed time indicating an elapsed time after the second imaging device starts recording; a second acquisition step of acquiring a required time to receive the second elapsed time after the requesting; and a calculation step of, based on the first elapsed time, the second elapsed time, and the required time, calculating an offset time for synchronizing a first moving image recorded by the first imaging device and a second moving image recorded by the second imaging device. When the information processing device is the second imaging device, the information processing device executes: a transmission step of acquiring the second elapsed time and transmitting the second elapsed time to the first imaging device in response to the requesting.

The present invention can be specified as an information processing method including at least part of the above steps, and can also be specified as an information processing device that executes the information processing method. Further, the present invention can be specified as a program for executing the method or a non-transient storage medium in which the program is recorded. The above processes and means can be freely combined and implemented as long as there is no technical contradiction.

BRIEF DESCRIPTION OF DRAWINGS

FIG. 1 is an overall configuration diagram of a video processing system.

FIG. 3 is a diagram illustrating problems of the related art.

FIG. 9 is an example of offset information stored in the master device.

DESCRIPTION OF EMBODIMENTS

First Embodiment

A video processing system according to the present embodiment is a system that images a player's performance of a musical instrument with a plurality of devices, and edits and outputs the acquired videos. The video processing system according to the present embodiment images a target by a plurality of portable computers (tablet computers) having cameras, and edits the videos by one of them.

FIG. 1 shows a configuration diagram of the video processing system according to the present embodiment.

Information processing devices 100A and 100B are devices for imaging the player who plays the musical instrument. The information processing devices 100A and 100B have built-in cameras and microphones, and can capture the player from different angles.

In the following description, the information processing device 100A functions as a device for recording videos or the like and supervising a plurality of information processing devices, and the information processing device 100B functions as a device for recording videos or the like according to an instruction obtained from the information processing device 100A. In the present specification, the former is referred to as a master device and the latter is referred to as a slave device.

When it is not necessary to distinguish between the master and the slave, the information processing device 100A and the information processing device 100B are simply referred to as an information processing device 100. The information processing device 100 is also called an imaging device. The information processing device 100 according to the present embodiment can operate as either the master device or the slave device.

Figure 2:
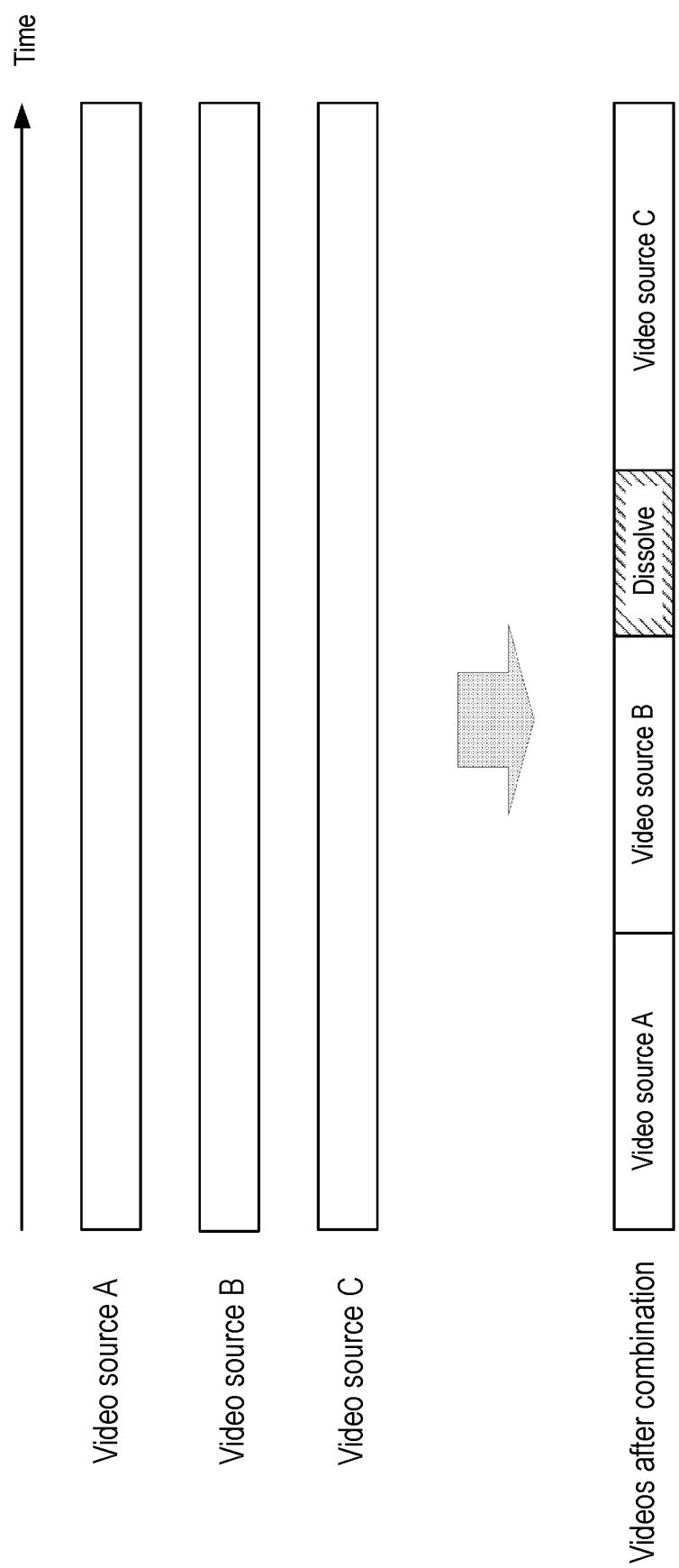
FIG. 2 is an example of combining and outputting a plurality of video sources.
Figure 4:
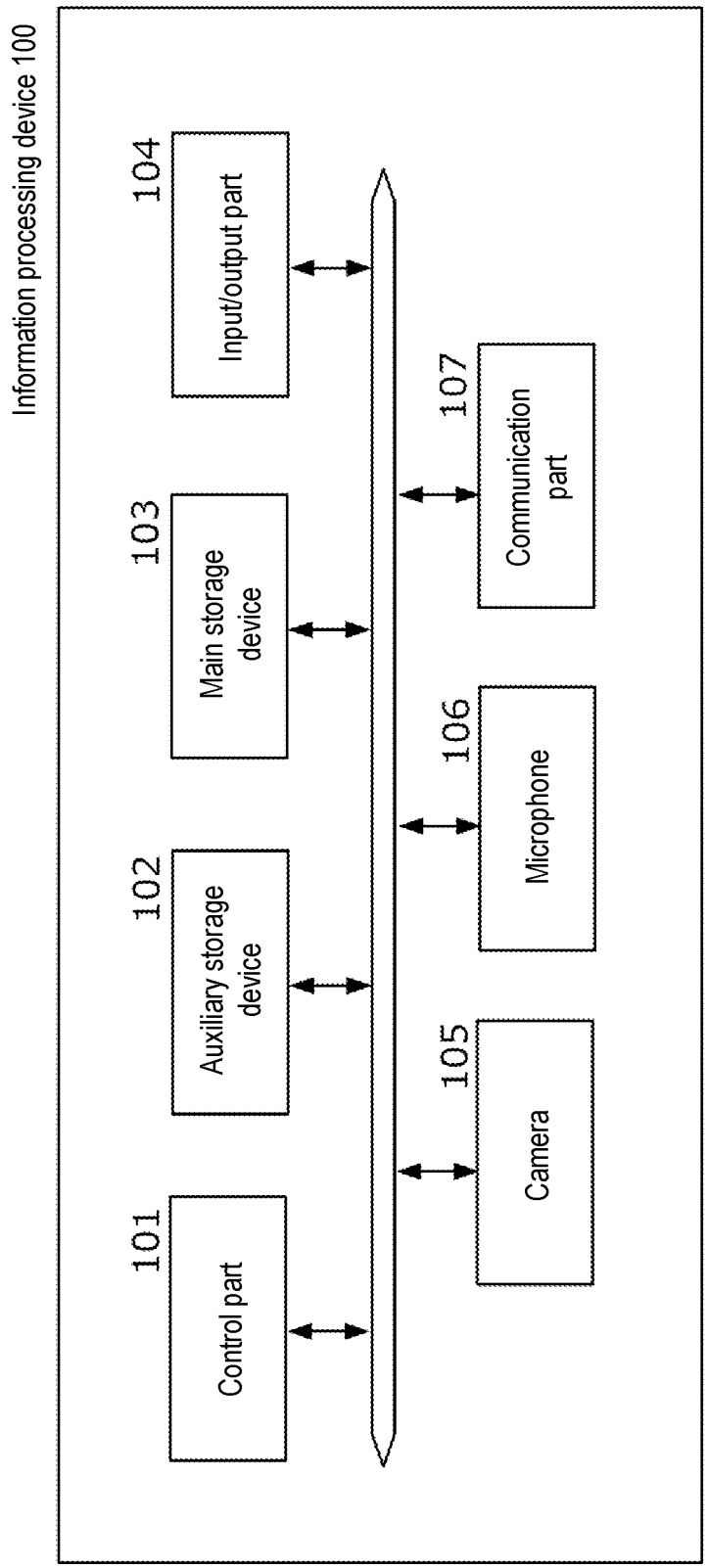
FIG. 4 is a hardware configuration diagram of an information processing device.

The master device instructs both the master device itself and the slave device to start and end recording, and after the recording ends, acquires the video source recorded by the slave device. Further, the master device can reorganize and output a plurality of acquired video sources based on a user's operation. Specifically, as shown in FIG. 2, a plurality of acquired video sources are combined and output.

Next, the problems in imaging a performance with a plurality of devices will be described with reference to (A) of FIG. 3.

One of the problems is that the timing at which each imaging device starts recording is not the same. For example, the illustrated video source A starts at time 1 while the video source B starts at a timing after time 1. That is, the heads of the video source A and the video source B do not match. This is because the timings at which the imaging devices start recording do not match each other. If editing is performed without matching the times, the timings of the videos may not match each other, causing problems such as giving the viewer a sense of discomfort.

In order to solve this problem, the information processing device 100A according to the first embodiment communicates with the information processing device 100B during recording of videos and collects information on a deviation time between the video sources. In addition, in the process of editing, the information is automatically used to correct the deviation between the video sources.

Next, the hardware configuration of the information processing device 100 will be described.

The information processing device 100 includes a control part 101, an auxiliary storage device 102, a main storage device 103, an input/output part 104, a camera 105, a microphone 106, and a communication part 107. These means are driven by the electric power supplied by a rechargeable battery.

The control part 101 is an arithmetic device in charge of controlling the control performed by the information processing device 100. The control part 101 is configured by, for example, a CPU (Central Processing Unit) or the like.

Specifically, the control part 101 performs processing of recording a target object by using the camera 105 and the microphone 106, which will be described later. Further, the control part 101 performs processing of acquiring an elapsed time (time stamp) from the start of recording, processing of calculating an offset time between the video sources acquired by a plurality of information processing devices 100 based on the time stamps acquired from a plurality of information processing devices 100, etc. Details of the processes will be described later with reference to the drawings.

The auxiliary storage device 102 is a rewritable non-volatile memory. The auxiliary storage device 102 stores a control program executed in the control part 101 and data used by the control program. Further, the recorded video file is recorded in the auxiliary storage device 102. The video file is read out according to an instruction of the control part 101, and is used for transmission or editing to another device.

The main storage device 103 is a memory in which the control program executed by the control part 101 and the data used by the control program are expanded. The program stored in the auxiliary storage device 102 is loaded into the main storage device 103 and executed by the control part 101, whereby the processes described below are performed. Furthermore, the main storage device 103 temporarily stores data in the process of recording.

The input/output part 104 includes a plurality of interface devices that present information to the user and accept an operation from the user. The input/output part 104 is composed of, for example, a touch panel display and a control unit thereof.

The camera 105 is a camera unit for imaging the target object. The camera 105 is arranged on a front surface or back surface of the device. The camera 105 may include a plurality of switchable camera units.

The microphone 106 is a unit for acquiring an audio.

The communication part 107 is an interface for performing wireless communication with another information processing device 100. The communication part 107 is configured to be capable of transmitting and receiving data to and from another information processing device 100, for example, according to a wireless communication standard such as IEEE 802.11 or Bluetooth (registered trademark).

Next, the processing performed by the control part 101 will be described.

Figure 5:
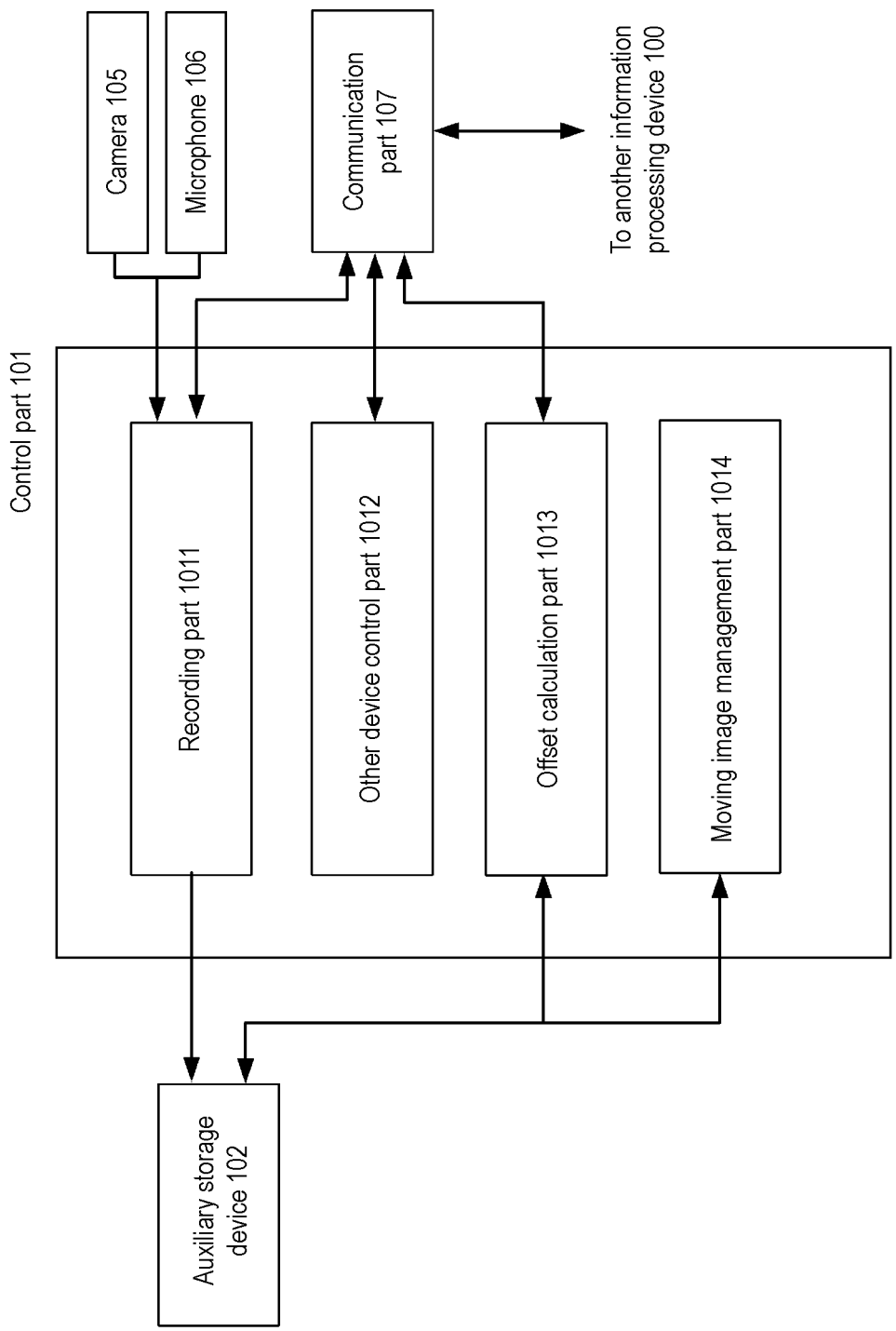
FIG. 5 is a module configuration diagram of the information processing device (control part).

FIG. 5 is a diagram showing the processing executed by the control part 101 of the information processing device 100 by functional blocks. The control part 101 has four functional blocks: a recording part 1011, an other device control part 1012, an offset calculation part 1013, and a moving image management part 1014.

The control part 101 changes the operation content thereof depending on whether the information processing device 100 operates as the master device or the slave device.

The user of the information processing device 100 specifies in advance whether to operate the device as the master device or the slave device. Further, at this time, the master device and the slave device may be paired.

When the information processing device 100 operates as the master device, the control part 101 controls recording in the master device and controls recording in the slave device. In addition, both the time stamp of the master device and the time stamp of the slave device are acquired, and control is performed to calculate the offset time between the video sources. Furthermore, the video file recorded by the slave device is acquired from the slave device, and control for editing a plurality of video sources is executed by using the calculated offset time.

When the information processing device 100 operates as the slave device, the control part 101 starts and ends recording based on an instruction from the master device. In addition, based on an instruction from the master device, the time stamp of the slave device is acquired and transmitted to the master device.

Hereinafter, the division of roles of the modules for executing the above-mentioned functions will be described.

The recording part 1011 acquires a video and an audio by using the camera 105 and the microphone 106 provided in the information processing device 100.

When the information processing device 100 is the master device, the recording part 1011 starts and ends recording based on a user's operation performed via the input/output part 104.

When the information processing device 100 is the slave device, the recording part 1011 starts and ends recording based on an instruction transmitted from the master device.

The acquired video and audio are converted into a predetermined format and recorded in the auxiliary storage device 102 as a video file.

The other device control part 1012 instructs another information processing device 100, which is the slave device, to start and end recording. The other device control part 1012 has information on the slave device in advance, and when the information processing device 100, which is the master device, starts recording, the other device control part 1012 instructs the slave device to start recording. In addition, when the master device ends recording, the other device control part 1012 instructs the slave device to end recording. Further, when the recording in the slave device ends, the video file is transferred from the slave device to the master device.

The offset calculation part 1013 calculates the deviation amount (offset) between the video source recorded by the information processing device 100, which is the master device, and the video source recorded by another device, which is the slave device. The specific method will be described later.

The moving image management part 1014 executes editing by using the video source recorded by another information processing device 100, which is the slave device, and the video source recorded by the information processing device 100, which is the master device.

The moving image management part 1014 provides a video editing screen to the user via the input/output part 104, and edits the video source based on an operation performed by the user. The edited video is stored in the auxiliary storage device 102, but can also be transmitted to the outside of the device via the communication part 107.

Next, the processing of recording the target object performed by the video processing system according to the first embodiment will be described.

Figure 6:
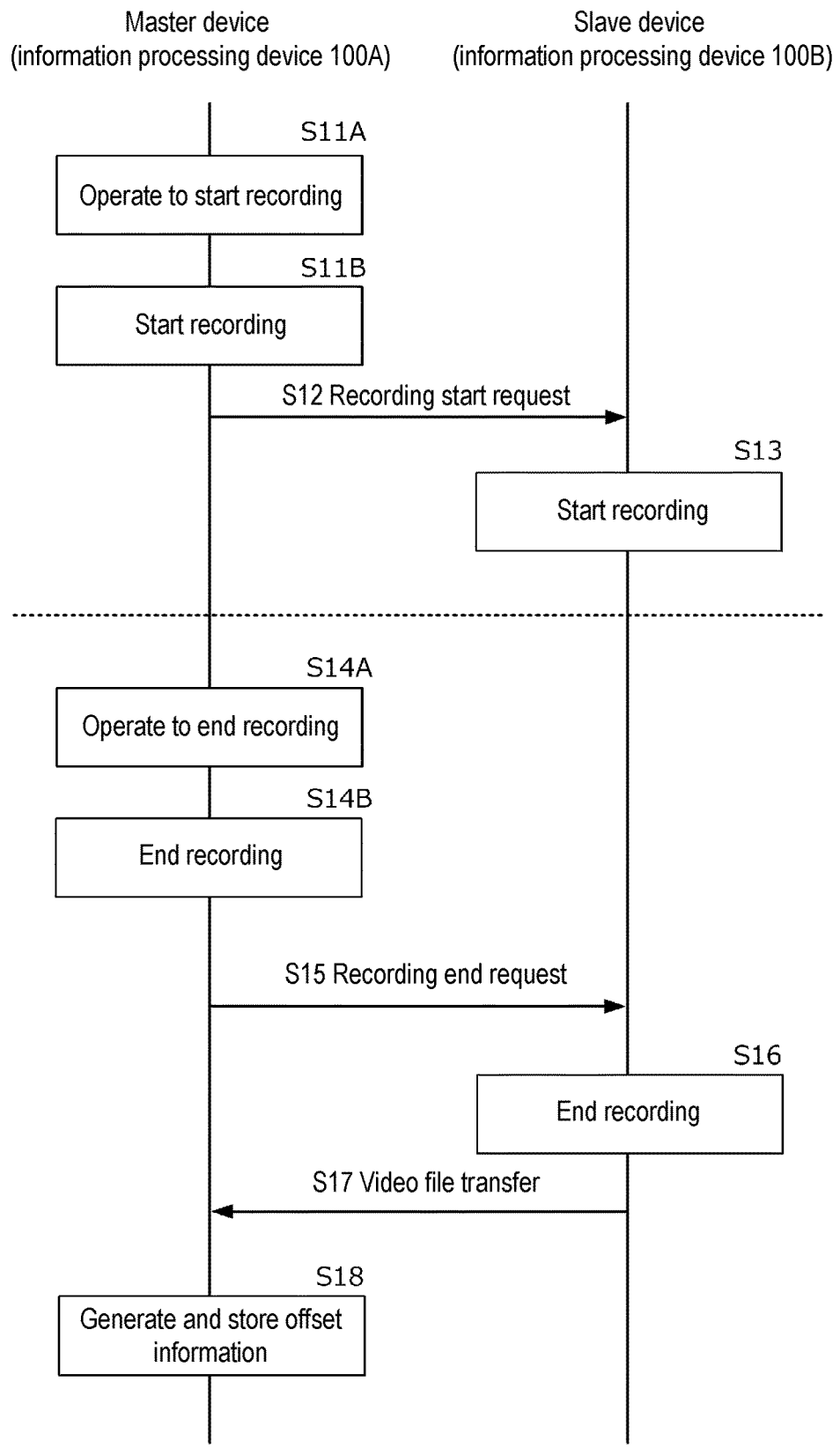
FIG. 6 is a flow chart of processing performed by a master device and a slave device.

Here, an example will be described in which the information processing device 100A is used as the master device and the information processing device 100B is used as the slave device, and imaging is performed by two devices. FIG. 6 is a flow chart showing the processing performed by the information processing device 100A, which is the master device, and the information processing device 100B, which is the slave device, and the flow of data transmitted/received between the devices.

In step S11A, when the user performs an operation to start recording via the input/output part 104 of the master device, in step S11B, the recording part 1011 starts recording.

Further, the other device control part 1012 transmits a signal (recording start request) instructing the slave device to start recording (step S12). When the recording part 1011 of the slave device receives the signal, the recording part 1011 starts recording in the same manner as the master device (step S13). Here, the slave device may transmit a response indicating that the recording is started normally to the master device.

Figure 7:
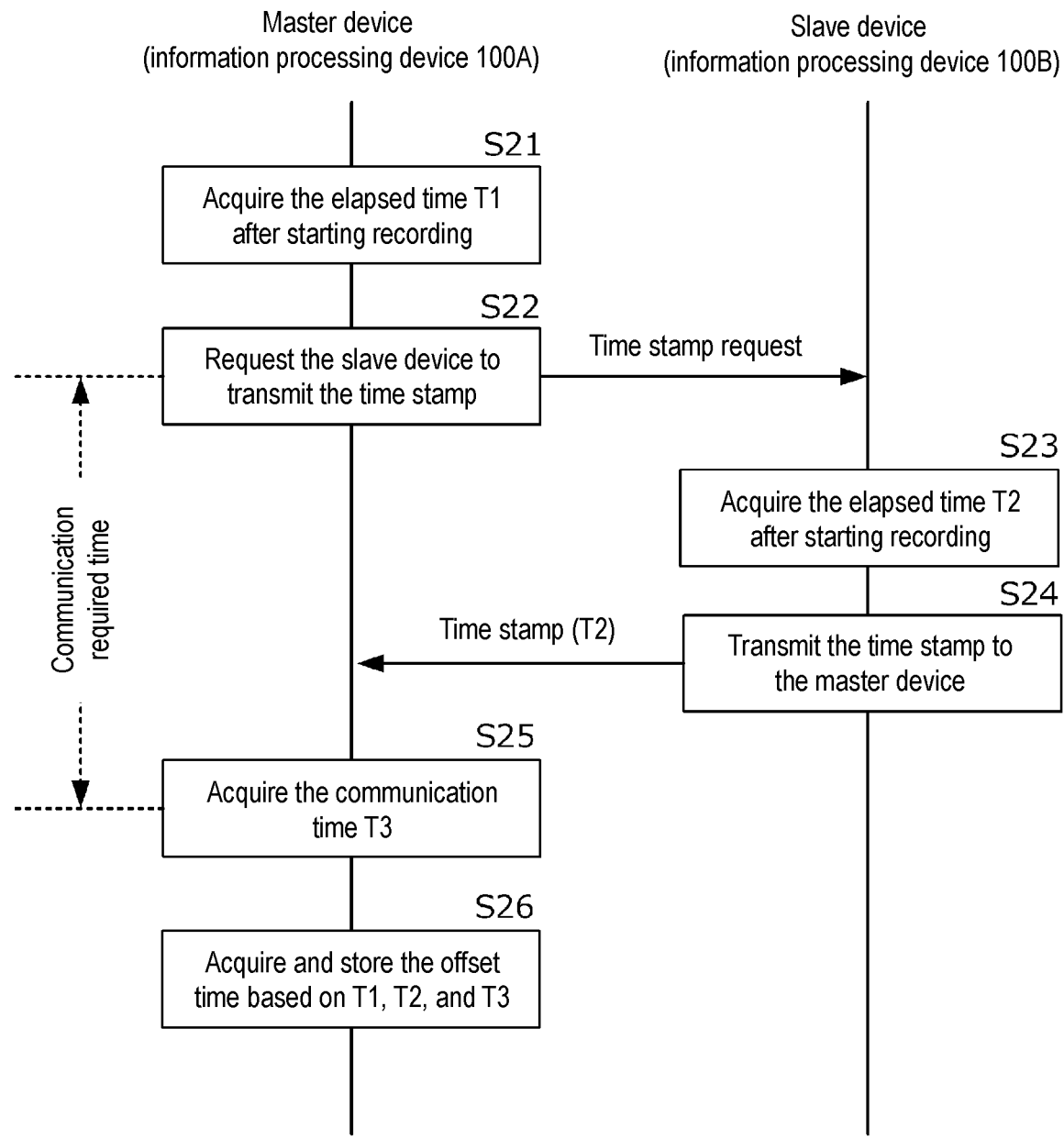
FIG. 7 is a flow chart of processing performed by the master device and the slave device.

Here, the processing of calculating the offset between the video recorded by the master device and the video recorded by the slave device will be described. FIG. 7 is a flow chart of the processing for calculating the offset between the videos.

The processing is executed by the offset calculation part 1013 of the master device after all the devices have started recording.

First, in step S21, the master device acquires the elapsed time (time stamp) after starting recording. The elapsed time can be acquired, for example, by referring to time information managed by the recording part 1011. The time stamp acquired here is $T_1$.

Next, in step S22, a signal requesting transmission of the time stamp (time stamp request) is transmitted to the slave device. In addition, measurement of a communication required time is started at the timing when the signal is transmitted. The communication required time is the time required to actually receive the time stamp after the time stamp request is transmitted to the slave device.

When the offset calculation part 1013 of the slave device receives the time stamp request, the offset calculation part 1013 acquires the elapsed time (time stamp) after the slave device starts recording (step S23). The time stamp acquired here is $T_2$. The time stamp $T_2$ is transmitted to the master device in step S24.

When the master device receives the time stamp $T_2$, the measurement of the communication required time is ended (step S25). The time obtained here is the communication required time $T_3$.

Figure 8:
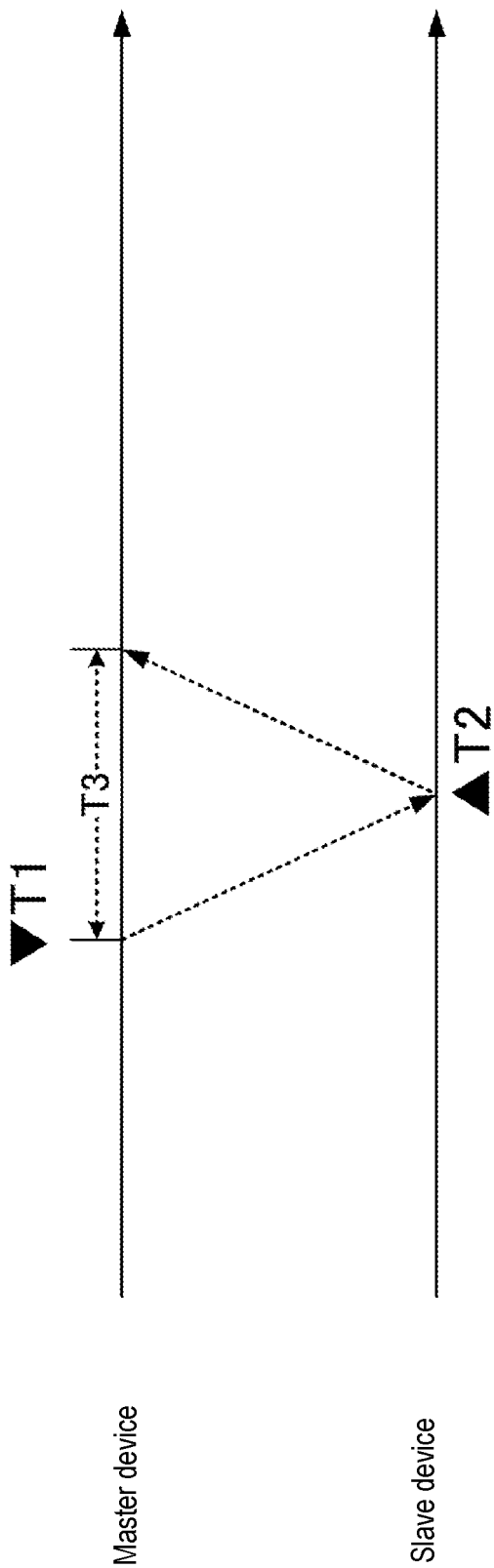
FIG. 8 is a diagram showing a relationship between a time stamp and a communication required time.

The relationship between $T_1$, $T_2$, and $T_3$ thus obtained is as shown in FIG. 8.

In step S26, the equation (1) is applied to the obtained $T_1$, $T_2$, and $T_3$. The time ΔT obtained here is the deviation time (offset time) between the video recorded by the master device and the video recorded by the slave device.

$$\Delta T = T_1 + (T_3/2) - T_2 \quad \text{Equation (1)}$$

The calculated offset time ΔT is temporarily stored by the offset calculation part 1013.

The description will be continued by reverting to FIG. 6.

In step S14A, when the user performs an operation to end recording via the input/output part 104 of the master device, in step S14B, the recording part 1011 stops recording.

Further, the other device control part 1012 transmits a signal (recording end request) instructing the slave device to stop recording (step S15). When the recording part 1011 of the slave device receives the signal, the recording part 1011 stops recording in the same manner as the master device (step S16). Here, the slave device may transmit a response indicating that the recording is stopped normally to the master device.

When the recording ends normally, the other device control part 1012 of the master device receives the video file from the slave device (step S17). This step may be automatically executed when the recording ends, or may be executed based on a user's instruction.

Next, in step S18, the offset calculation part 1013 of the master device stores the following information.
  the file name of the video file recorded by the master device
  the file name of the video file recorded by the slave device
  the time stamp (T1) acquired by the master device
  the time stamp (T2) acquired by the slave device
  the communication required time (T3)
  the calculated offset (ΔT)

The offset calculation part 1013 stores these information (hereinafter referred to as offset information) in the auxiliary storage device 102 together with the video file. FIG. 9 is an example of the offset information stored in the master device in step S18.

When the transfer of the video file and the acquisition of the offset information are completed, the video can be edited by the master device (moving image management part 1014). The moving image management part 1014 arranges a plurality of video files on a timeline and accepts an editing operation from the user.

Figure 10:
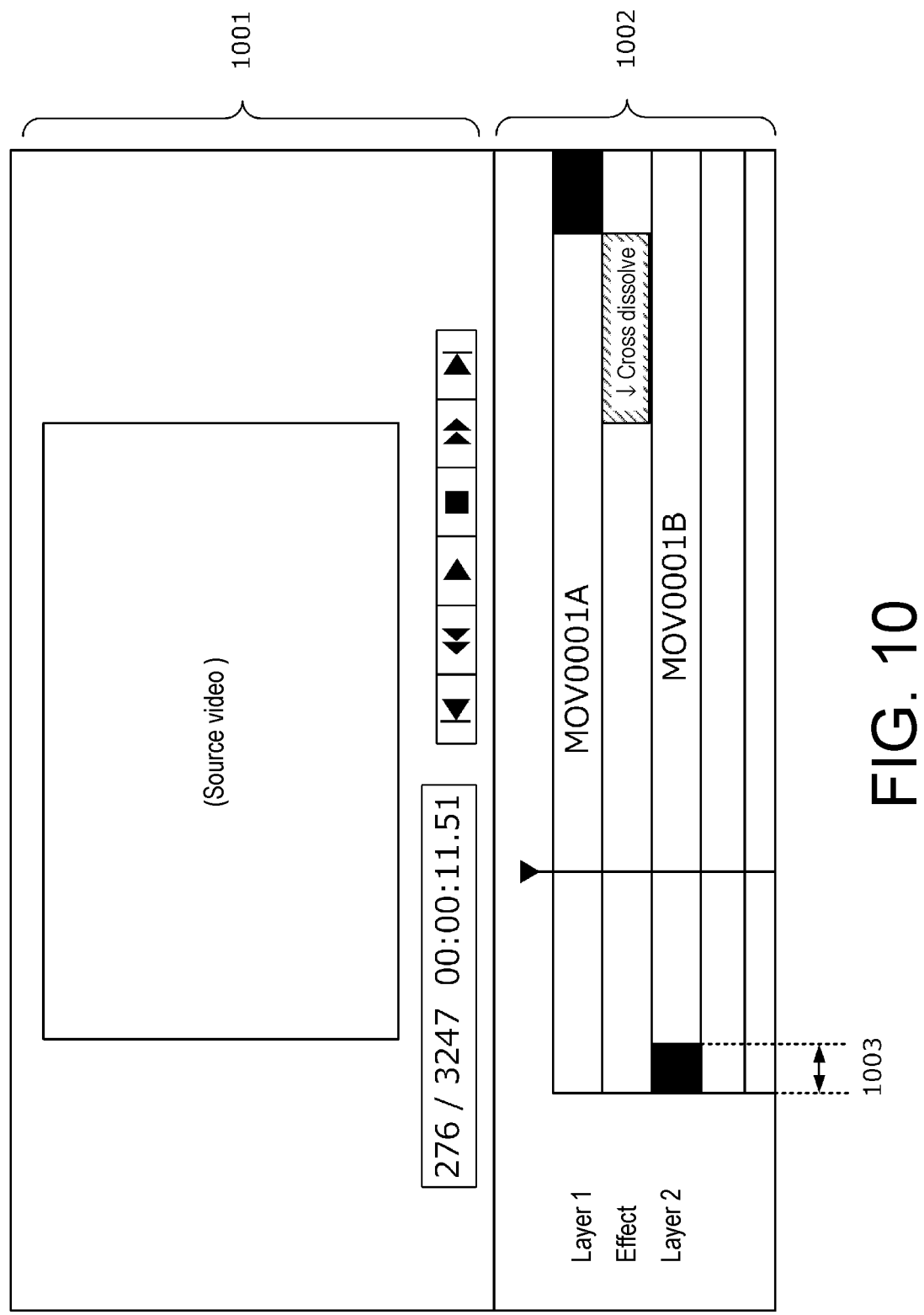
FIG. 10 is an example of an editing screen provided by the master device.

FIG. 10 is an example of an editing screen provided to the user of the information processing device 100A.

The editing screen includes an area 1001 to which a source screen, a control button, etc. are output, and an area 1002 to which the timeline is output. In this example, one layer is assigned to each of a plurality of video sources, and it is possible to specify transition between layers (for example, cross dissolve, whiteout, blackout, wipe, extrude, iris, etc.) and multi-angle.

When the user performs an output operation after editing on the screen, the video reflecting the edited content is finally output. The audio track included in any of the video sources can be used as the audio track at the time of output. For example, the audio recorded by the master device can be adopted as the entire audio source.

In the present embodiment, when a plurality of files defined in the offset information are arranged on the timeline, the moving image management part 1014 adjusts the arrangement positions so that both video sources are synchronized.

The offset information shown in FIG. 9 will be described as an example. In this case, FIG. 9 shows that there is an offset time of 0.25 seconds between the video source included in the video file "MOV0001A" and the video source included in "MOV0001B." In this case, at the time point when the video sources corresponding to "MOV0001A" and "MOV0001B" are arranged on the timeline, the start time of either of the video sources (preferably the video source arranged later) is shifted by the offset time. For example, in the example of FIG. 10, the video source corresponding to "MOV0001B" is shifted and arranged behind by 0.25 seconds (reference sign 1003). In other words, a blank time is inserted at the beginning of the video source corresponding to "MOV0001B." If the offset value is negative, a part of the video may be cut.

In the first embodiment, the moving image management part 1014 performs such processing to synchronize a plurality of video sources.

The blank time corresponding to the offset time may be shown graphically so that the user can discriminate the blank time. Further, when both video sources are synchronized, an indicator indicating the same may be displayed on the screen.

Furthermore, each of the video sources may be movable to an arbitrary position on the timeline. In addition, when a certain video source is moved, another paired video source may follow. That is, the relative positions between the video sources may be automatically kept so as to maintain the offset time.

As described above, according to the first embodiment, in the system in which the master device and the slave device image the target object, the devices communicate with each other, thereby acquiring the offset time between the video sources, and automatically correcting the positions of the video sources based on the calculated offset time in the process of editing. According to such a configuration, the video sources can be synchronized even if the timing at which recording is started varies between the devices.

In the first embodiment, the offset time is calculated only once, but the offset time may be calculated multiple times. In this case, the processing shown in FIG. 7 may be performed multiple times to acquire a representative value (for example, an average value) of the obtained offset times. Since the communication required time between the devices is very short, it may not be possible to calculate the accurate offset time with just one communication, but the accuracy can be improved by calculating the offset time multiple times to obtain the representative value.

Second Embodiment

In the first embodiment, the master device executes the processing shown in FIG. 7 to acquire the offset time after both the master device and the slave device start recording. However, in this form, there are cases where the video sources cannot be sufficiently synchronized.

This problem will be described with reference to (B) of FIG. 3.

One of the problems is that the clocks are not synchronized between the imaging devices. For example, because the imaging device for acquiring the illustrated video source A and the imaging device for acquiring the video source C operate by different clocks, there is a difference in timekeeping ability, and consequently a deviation in time may occur. For example, even though a performance of the same length (10 minutes and 0 second) is recorded, one imaging device may clock 9 minutes and 59 seconds, and another imaging device may clock 10 minutes and 1 second. If this deviation is not dealt with, the deviation width will increase as time passes (for example, as the music progresses).

In the second embodiment, in order to cope with this, the processing of acquiring the offset time described in the first embodiment is periodically executed.

In the second embodiment, the master device executes the processing shown in FIG. 7 between step S13 and step S14A every predetermined cycle (hereinafter referred to as first cycle), and accumulates information on the offset time.

Figure 11:
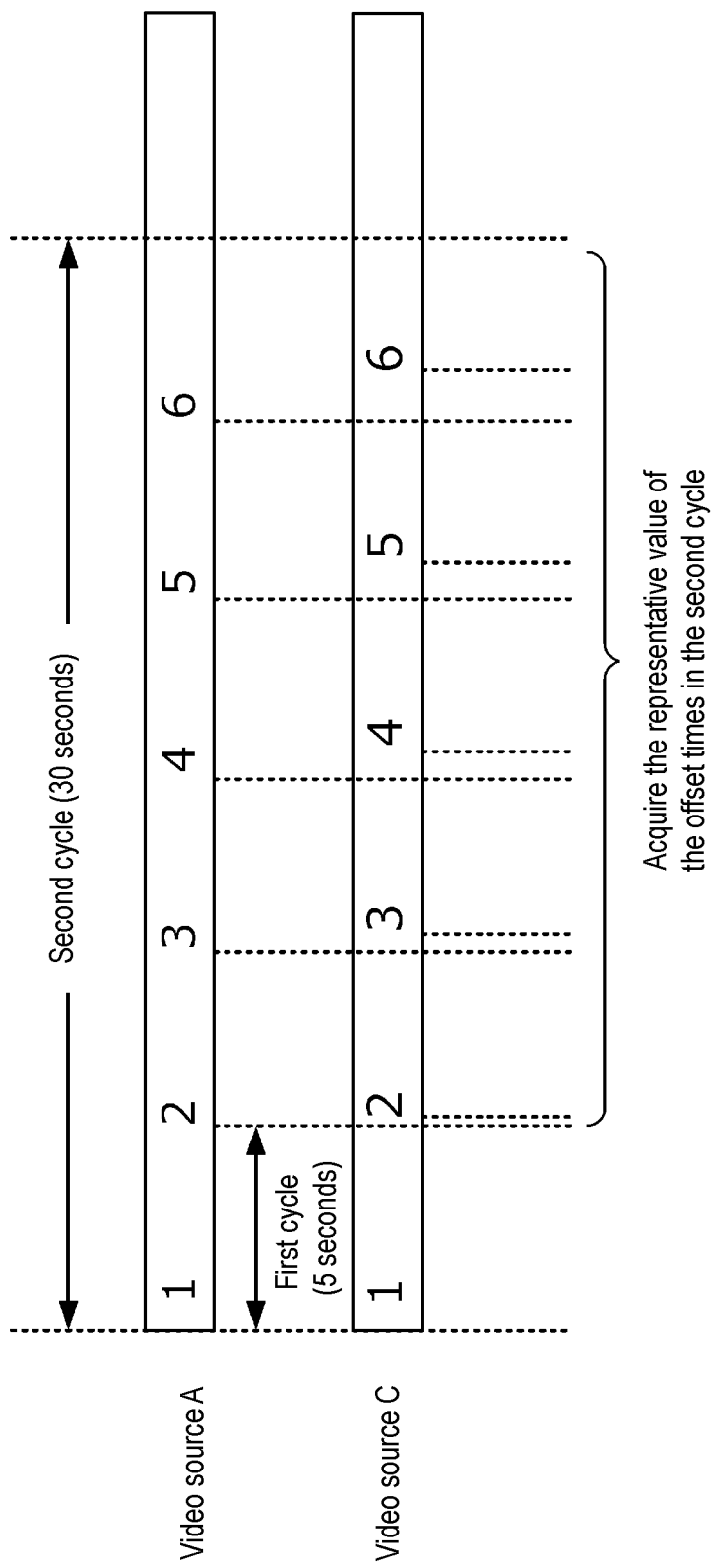
FIG. 11 is a diagram illustrating processing performed by the master device in the second embodiment.

As a result, a plurality of offset times are acquired in the first cycle. In the second embodiment, the plurality of offset times thus obtained are further integrated every second cycle, and a representative value thereof is obtained. FIG. 11 is a diagram showing a relationship between the first cycle and the second cycle.

Figure 12:
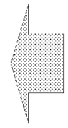
FIG. 12 is an example of offset information generated in the second embodiment.

FIG. 12 is a diagram showing the plurality of offset times acquired in the first cycle. In this example, the processing of calculating the offset time is executed every 5 seconds, and the representative value thereof is acquired every 30 seconds. For example, an average value or a median value can be adopted as the representative value. Then, the representative value of the offset times acquired in this way is treated as the deviation time in the second cycle. In the case of the illustrated example, the average value, 0.3 seconds, of the offset times is treated as the representative value of the offset times in 30 seconds.

In the first embodiment, the video sources are synchronized by inserting the time indicated by the reference sign 1003. That is, the position of the video source is corrected only once. On the other hand, in the second embodiment, the position of the video source is corrected at each timing of switching the video source. This is because the deviation width increases as time passes, and a sufficient effect cannot be obtained with only one correction.

Figure 13:
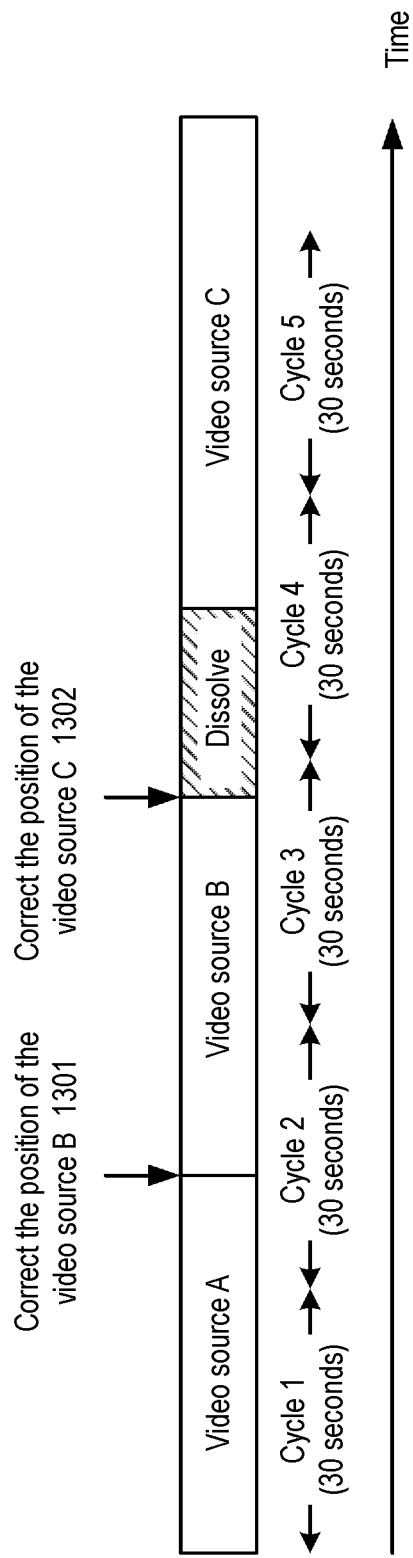
FIG. 13 is a diagram illustrating a correction timing in the second embodiment.

FIG. 13 is a diagram illustrating the timing for performing correction. In this example, the position of the video is corrected at the timing when a new video appears on the screen. Specifically, the position of the video source B is corrected at the timing indicated by the reference sign 1301, and the position of the video source C is corrected at the timing indicated by the reference sign 1302. At the timing indicated by the reference sign 1301, correction is performed by using the offset time corresponding to the cycle 2, and at the timing indicated by the reference sign 1302, correction is performed by using the offset time corresponding to the cycle 3. If the offset time is a positive value, the correction may be performed by inserting a blank time, and if the offset time is a negative value, a part of the video may be cut.

As described above, according to the second embodiment, the offset time is periodically calculated in the first cycle, and then the position of the video source is corrected by using the representative value of the offset times. According to such a configuration, it is possible to cope with a case where the deviation increases as time passes.

In the second embodiment, the representative value of the offset times calculated every first cycle is calculated every second cycle, but the position of the video source may be corrected by directly using the offset times calculated every first cycle without calculating the representative value of the offset times.

Modified Example

The above embodiment is merely an example, and the present invention may be appropriately modified and implemented without departing from the gist thereof. For example, the illustrated embodiments may be implemented in combination.

In addition, in the description of the embodiment, a tablet computer having a built-in camera is exemplified as the imaging device, but the imaging device may be in other forms.

Further, in the description of the embodiment, the example shows that one master device and one slave device are provided, but the number of the slave devices may be more than one. In this case, the processing shown in steps S12 to S13 and S15 to S18 may be executed for the number of the slave devices. Furthermore, the processing shown in FIG. 7 may be similarly executed for the number of the slave devices to respectively acquire the offset information. In this case, the position correction of the video source may be executed for each pair of video sources. For example, when the video source A is acquired by the master device and the video sources B and C are acquired by the slave devices, the positions of the video sources B and C may be respectively corrected with the video source A as a reference.

Further, in the description of the embodiment, the master device plays a central role in managing the offset time for all the slave devices, but it is not always necessary for one master device which also serves as an imaging device to manage the offset time. For example, a plurality of information processing devices may be distributed to manage the offset time, or a server device that manages a plurality of imaging devices (that do not have an imaging function) may calculate and manage the offset time.

In addition, the video editing is not necessarily executed by the master device. For example, a server device that manages a plurality of imaging devices may receive video sources from a plurality of information processing devices and execute the editing.

Moreover, in the description of the embodiment, as shown in FIG. 8, it is assumed that the time indicated by the time stamp $T_2$ exists at the timing corresponding to half of the communication required time $T_3$, but the present invention is not necessarily limited to this form. For example, when the time required for the processing in the device (the time required from receiving the request to returning the response) is known, the offset time may be calculated in consideration of the time.

Further, in the description of the embodiment, the master device instructs the slave device to start and end recording, but the recording may be started and ended manually.

What is claimed is:

1. An information processing method, executed by a first imaging device in a video system that images a target object by using the first imaging device and a second imaging device, the information processing method comprising:
   acquiring a first elapsed time indicating an elapsed time after the first imaging device starts recording;
   requesting the second imaging device to transmit a second elapsed time indicating an elapsed time after the second imaging device starts recording, and receiving the second elapsed time;
   acquiring a required time to receive the second elapsed time after the requesting; and
   based on the first elapsed time, the second elapsed time, and the required time, calculating an offset time for synchronizing a first moving image recorded by the first imaging device and a second moving image recorded by the second imaging device.

2. The information processing method according to claim 1, wherein when the first elapsed time is T1, the second elapsed time is T2, and the required time is T3,
   a difference between T1+(T3/2) and T2 is taken as the offset time.

3. The information processing method according to claim 2, wherein the first imaging device acquires the second moving image from the second imaging device and stores the second moving image in association with the offset time.

4. The information processing method according to claim 3, further comprising:
   synchronizing the first moving image and the second moving image by using the offset time, and synthesizing synchronized moving images to generate a third moving image.

5. The information processing method according to claim 2, further comprising:
   periodically calculating the offset time within a predetermined time width, and acquiring a representative value of a plurality of the offset times obtained,
   wherein the representative value is taken as an offset time between the first moving image and the second moving image within the predetermined time width.

6. The information processing method according to claim 1, wherein the first imaging device acquires the second moving image from the second imaging device and stores the second moving image in association with the offset time.

7. The information processing method according to claim 6, further comprising:
   synchronizing the first moving image and the second moving image by using the offset time, and synthesizing synchronized moving images to generate a third moving image.

8. The information processing method according to claim 7, further comprising:
   calculating the offset time within a predetermined time width, and acquiring a representative value of a plurality of the offset times obtained,
   wherein the representative value is taken as an offset time between the first moving image and the second moving image within the predetermined time width.

9. The information processing method according to claim 6, further comprising:
   periodically calculating the offset time within a predetermined time width, and acquiring a representative value of a plurality of the offset times obtained,
   wherein the representative value is taken as an offset time between the first moving image and the second moving image within the predetermined time width.

10. The information processing method according to claim 1, further comprising:
    periodically calculating the offset time within a predetermined time width, and acquiring a representative value of a plurality of the offset times obtained,
    wherein the representative value is taken as an offset time between the first moving image and the second moving image within the predetermined time width.

11. A non-transient computer-readable recording medium, recording a program, causing a computer to execute the information processing method according to claim 1.

12. An information processing method, executed by an information processing device operable as a first imaging device and a second imaging device in a video system that images a target object by using the first imaging device and the second imaging device,
    wherein when the information processing device is the first imaging device, the information processing device executes:
    acquiring a first elapsed time indicating an elapsed time after the first imaging device starts recording;
    requesting the second imaging device to transmit a second elapsed time indicating an elapsed time after the second imaging device starts recording;
    acquiring a required time to receive the second elapsed time after the requesting; and
    based on the first elapsed time, the second elapsed time, and the required time, calculating an offset time for synchronizing a first moving image recorded by the first imaging device and a second moving image recorded by the second imaging device, wherein when the information processing device is the second imaging device, the information processing device executes:

acquiring the second elapsed time and transmitting the second elapsed time to the first imaging device in response to the requesting.

13. A non-transient computer-readable recording medium, recording a program, causing a computer to execute the information processing method according to claim 12.

14. An information processing device, operating as a first imaging device in a video system that images a target object by using the first imaging device and a second imaging device, the information processing device comprising:

a processor, configured to:
acquire a first elapsed time indicating an elapsed time after starting recording;
request the second imaging device to transmit a second elapsed time indicating an elapsed time after the second imaging device starts recording, and receiving the second elapsed time;
acquire a required time to receive the second elapsed time after the requesting; and
based on the first elapsed time, the second elapsed time, and the required time, calculate an offset time for synchronizing a first moving image recorded by the first imaging device and a second moving image recorded by the second imaging device.

15. The information processing device according to claim 14, wherein when the first elapsed time is T1, the second elapsed time is T2, and the required time is T3,
the processor takes a difference between T1+(T3/2) and T2 as the offset time.

16. The information processing device according to claim 14, wherein the first imaging device acquires the second moving image from the second imaging device and stores the second moving image in association with the offset time.

17. The information processing device according to claim 16, wherein the processor is further configured to:
synchronize the first moving image and the second moving image by using the offset time, and synthesize synchronized moving images to generate a third moving image.

18. The information processing device according to claim 14, wherein the processor periodically calculates the offset time within a predetermined time width, and acquires a representative value of a plurality of the offset times obtained, and
takes the representative value as an offset time between the first moving image and the second moving image within the predetermined time width.

* * * * *